(12) United States Patent
Tan

(10) Patent No.: US 7,728,618 B1
(45) Date of Patent: Jun. 1, 2010

(54) SELF-CALIBRATING WRITER

(75) Inventor: Kee Hian Tan, New Tech Park (SG)

(73) Assignee: Marvell International Ltd., Hamilton (BM)

( * ) Notice: Subject to any disclaimer, the term of this patent is extended or adjusted under 35 U.S.C. 154(b) by 77 days.

(21) Appl. No.: 11/935,061

(22) Filed: Nov. 5, 2007

Related U.S. Application Data

(60) Provisional application No. 60/864,281, filed on Nov. 3, 2006.

(51) Int. Cl.
*H03K 19/003* (2006.01)
(52) U.S. Cl. .............................. 326/30; 326/86; 327/108
(58) Field of Classification Search .................... 326/30, 326/86; 327/108
See application file for complete search history.

(56) References Cited

U.S. PATENT DOCUMENTS 5,783,965 A * 7/1998 Iwatsuki et al. ............. 327/532
5,898,326 A * 4/1999 Okayasu ..................... 327/112
5,955,911 A * 9/1999 Drost et al. .................. 327/404
6,670,821 B2 * 12/2003 Ajit ............................. 326/32
6,734,712 B2 * 5/2004 Holdenried et al. ......... 327/350
2004/0090239 A1 * 5/2004 Ikeoku et al. ................. 326/30

* cited by examiner

*Primary Examiner*—Vibol Tan

(57) ABSTRACT

In accordance with the invention, a method, system and apparatus are presented that matches the output impedance of a driver to the impedance of a transmission line. A method for matching the impedance between a driver and a transmission line, wherein the transmission line is between the driver and a load can include transmitting a first pulse from the driver to the load through the transmission line, wherein a first reflection from the transmitted first pulse occurs after a first time, measuring a second reflection from the transmitted first pulse after a second time, and adjusting the calibration of the driver in response to the measured second reflection.

8 Claims, 9 Drawing Sheets time in nano seconds (ns)

SELF-CALIBRATING WRITER

RELATED APPLICATIONS

This application claims the benefit of priority to U.S. Provisional Appln. No. 60/864,281, filed Nov. 3, 2006, titled "Self-Calibrating Writer," which is herein incorporated by reference in its entirety.

FIELD

The present invention is directed to a method, apparatus, and system for adjusting the impedance matching between a driver and a transmission line and, more specifically, for correcting an impedance mismatch between the driver and the transmission line.

BACKGROUND

Electrical impedance occurs when there is opposition between a source that transmits an electric pulse and a receiver of that electric pulse. Impedance is a combination of two components, resistance and reactance. Resistance is generally in phase with the source signal and is represented by the real component of the impedance. Reactance refers to the out-of-phase portion of the impedance and is represented by the imaginary component of the impedance. When the impedance of a driver and that of its load, which may include a transmission line and/or a receiver, are not matched, then signals transmitted from the driver will be reflected by the load. These reflections cause noise and ringing in the signal. In an arrangement with a driver, a receiver and a transmission line, impedance mismatch may occur between the driver and the receiver as well as between the driver and the transmission line. Thus, there may be two reflections of a transmitted signal; one from the driver's mismatch with the receiver, and one from the driver's mismatch with the transmission line. Reflections from impedance mismatch should be avoided in circuit design.

The impedance of the driver can be matched to the impedance of the transmission line by adjusting the voltage-to-current (voltage/current) characteristics of the driver. Efforts to accomplish this impedance matching are tedious and may not be accurate because of the introduction of parasitics into the driver circuit during adjustments. Furthermore, the output impedance of a driver is typically adjusted once and then set. The driver output impedance, then, is insensitive to changes in the impedance of the transmission line.

There is a need, therefore, to provide more effective ways of correcting for impedance mismatch in the transmission of a pulse from a driver to a load.

SUMMARY

In accordance with some embodiments of the invention, a method and apparatus for matching the output impedance of a driver to the impedance of a transmission line is presented. A method for matching the impedance between a driver and a transmission line, wherein the transmission line is between the driver and a load can include transmitting a first pulse from the driver to the load through the transmission line, wherein a first reflection from the transmitted first pulse occurs after a first time, measuring a second reflection from the transmitted first pulse after a second time, and adjusting the calibration of the driver in response to the measured second reflection.

In some embodiments, a method for adjusting the output impedance of a driver to the impedance of a transmission line coupled to the driver and a load can include establishing a range of voltages corresponding to a settling voltage, transmitting a first pulse from the driver to the load through the transmission line, wherein a first reflection from the transmitted first pulse occurs after a first time, measuring a second reflection from the transmitted first pulse by determining the time after a first time that a voltage of the second reflection lies outside the range of voltages, and adjusting the calibration of the driver in response to the measured second reflection.

An apparatus for matching impedance between a driver and a transmission line, can include a writer circuit, the writer circuit including, a first switch coupled to charge a capacitor when a voltage is outside a range of voltages, and a second switch coupled to allow current through the first switch after a first time, and an impedance matching circuit receiving a voltage across the capacitor of the writer circuit, the impedance matching circuit adjusting an output impedance of the driver in response to the voltage across the capacitor.

It is to be understood that both the foregoing general description and the following detailed description are exemplary and explanatory only and are not restrictive of the invention, as claimed. The invention will be further described with respect to the accompanying drawings, which are incorporated in and constitute a part of this specification.

DETAILED DESCRIPTION

Figure 1A:
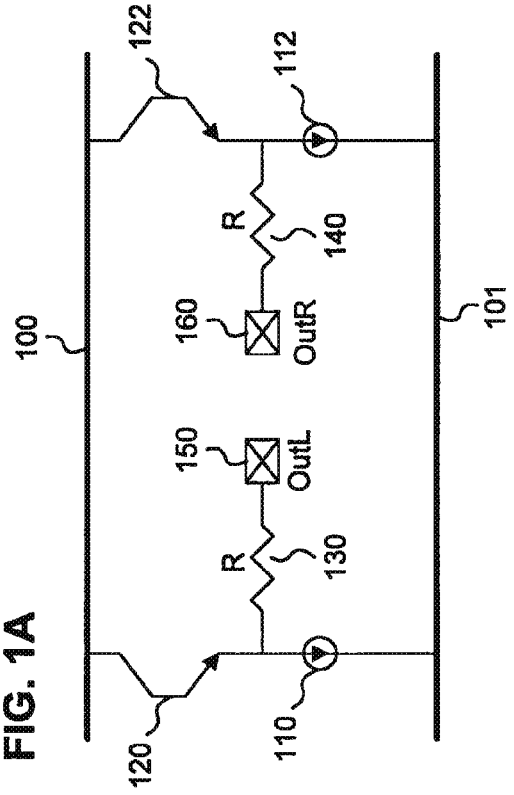
FIG. 1A illustrates diagram of a circuit used for impedance matching.

FIG. 1A illustrates a circuit for impedance matching between a driver and a load. As shown in FIG. 1A, a transistor 120 is coupled in series with a current source 110 between rails 100 and 101. Current source 110 may be used to bias transistor 120. Additionally, a transistor 122 is coupled in series with a current source between rails 100 and 101. The base of transistors 120 and 122 are coupled to one or more internal driver circuits. Rail 100 may, for example, be a power supply voltage while rail 101 may, for example, be a ground. Fixed resistor 130 is coupled between output node 150 and the junction between transistor 120 and current source 110. Similarly, resistor 140 is coupled between output node 160 and the junction between transistor 122 and current source 112. Current source 112 may be used to bias transistor 122. An output signal pulse is sent through nodes 150 and 160. Fixed resistors 130 and 140 are used to match the impedance of the driver coupled to nodes 150 and 160 with a load coupled between nodes 150 (OUTS) and 160 (OUTR).

Figure 1B:
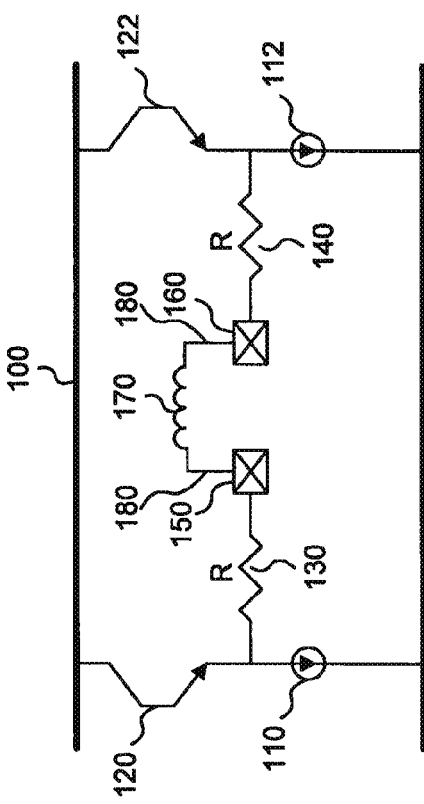
FIG. 1B illustrates a circuit used for impedance matching.

FIG. 1B illustrates another circuit that can be utilized for impedance matching. The circuit in FIG. 1B is similar to the circuit shown in FIG. 1A except that an inductor 170 is also coupled between nodes 150 and 160. Both inductor 170 and transmission line 180 are loads, which current may drive. Current may be from current source 110 or 112.

Figure 2:
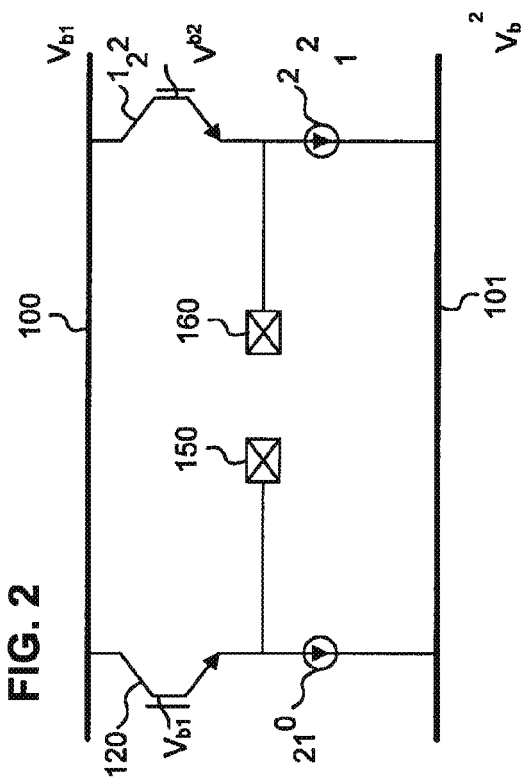
FIG. 2 illustrates a circuit used for impedance matching.

FIG. 2 illustrates another circuit that can be utilized for impedance matching. The circuit illustrated in FIG. 2 includes transistors 120 and 122 coupled in series with current source 210 and 212, respectively, between nodes 100 and 101. Node 150 is coupled to the junction between transistor 120 and current source 210. Node 160 is coupled to the junction between transistor 122 and current source 212. The gates of transistors 120 and 122 are coupled to voltages $V_{b1}$ and $V_{b2}$, respectively. Transistors 120 and 122, then, provide resistances that are dependant on the voltages $V_{b1}$ and $V_{b2}$, respectively, in order to match the impedance to transmission line 180 coupled between nodes 150 and 160.

Current flowing through current sources 120 and/or 122 may be monitored to sense the strength of a reflected first or second pulse back into nodes 150 and 160. The strength of the first reflection typically indicates the degree of impedance mismatch between the driver and inductor 170. The second reflection typically indicates the degree of impedance mismatch between the driver and the transmission line coupled between nodes 150 and 160. In FIG. 2, the strength of the reflected pulse can be utilized to adjust the voltage values $V_{b1}$ and $V_{b2}$. In FIGS. 1A and 1B, the strength of the reflected pulse can be utilized to adjust the resistance of resistors 130 and 140 and the inductance of inductor 170.

Figure 3:
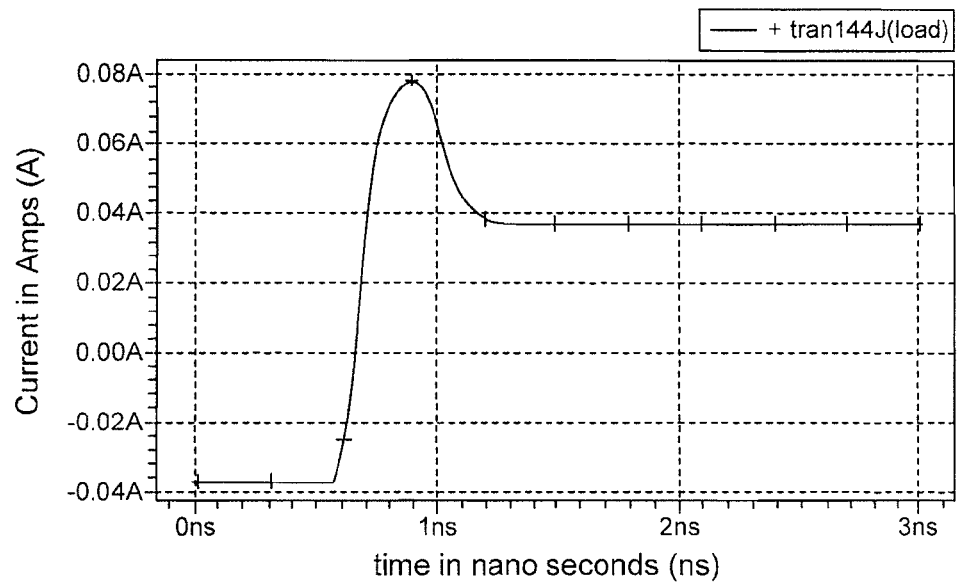
FIG. 3 shows a graph depicting the current between output nodes of the circuit shown in FIG. 1A, 1B, or 2 as a pulse is being driven through the transmission line.

FIG. 3 shows a graph of the current through inductor 170 shown in FIG. 1B as a function of time for a sent pulse. The impedances of the driver and transmission line in this example are matched, as can be seen by the flat, straight portion of the line occurring after the main peak, which settles after about 1.6 ns in this figure. In the event of an impedance mismatch, a reflection of the portion of the pulse would be reflected from the transmission line.

Figure 4:
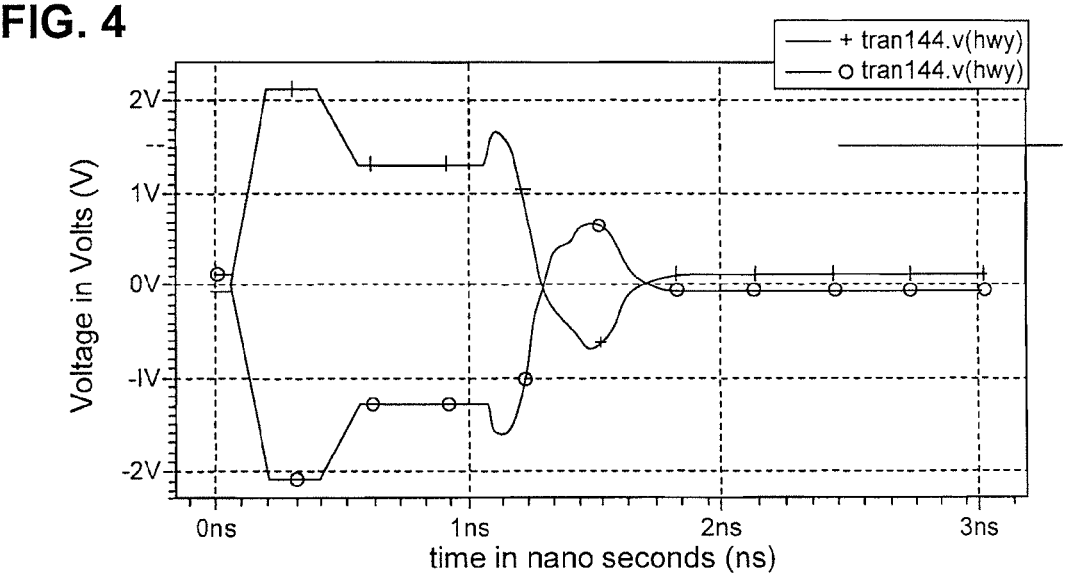
FIG. 4 shows a graph depicting the voltage across the node as a function of time under the conditions illustrated in FIG. 3.

FIG. 4 shows the voltage between nodes 150 and 160 as a function of time for the same pulse depicted in FIG. 3. The range of voltages (0.1V to –0.1V) between the two straight lines occurring between 1.8 ns and 3 ns represents the settling voltage. FIGS. 3 and 4 depict the circumstance when there is substantially no impedance mismatch between the driver and the transmission line, which is attached between inductor 170 and nodes 150 and 160.

Figure 5:
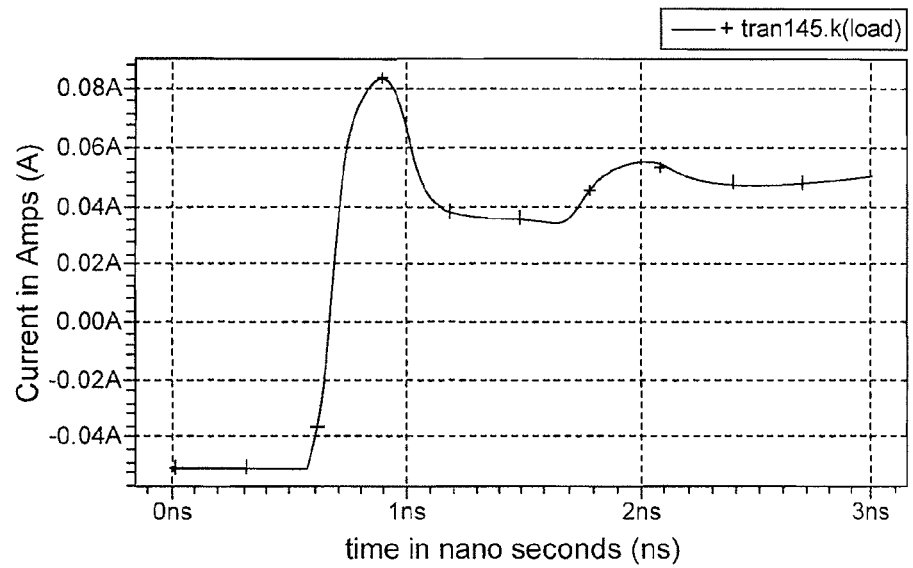
FIG. 5 shows a graph depicting the current through the transmission line as a function of time for a sent pulse.
Figure 6:
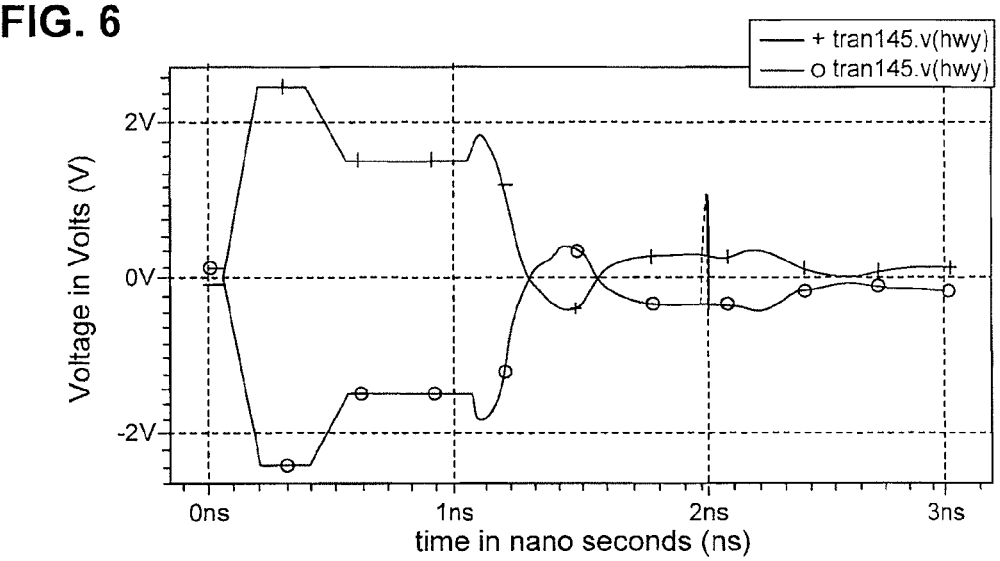
FIG. 6 shows a graph depicting the voltage as a function of time for a sent pulse as described in FIG. 5.

FIGS. 5 and 6 illustrate the situation where there is an impedance mismatch between the driver and transmission line. FIG. 5 is a graph depicting the current between nodes 150 and 160 as a function of time for a sent pulse. The pulse sent in the graph is between the driver and transmission line. As can be seen in FIG. 5, the impedance mismatch results in a reflection pulse at around 2 ns, between about 1.8 ns and about 3 ns.

FIG. 6 illustrates the voltage as a function of time for the same pulse depicted in FIG. 5. The range of voltages between the two vertical irregular lines occurring between about 1.6 ns and 3 ns may represent disturbance caused by an impedance mismatch between the driver and transmission line.

Figure 7:
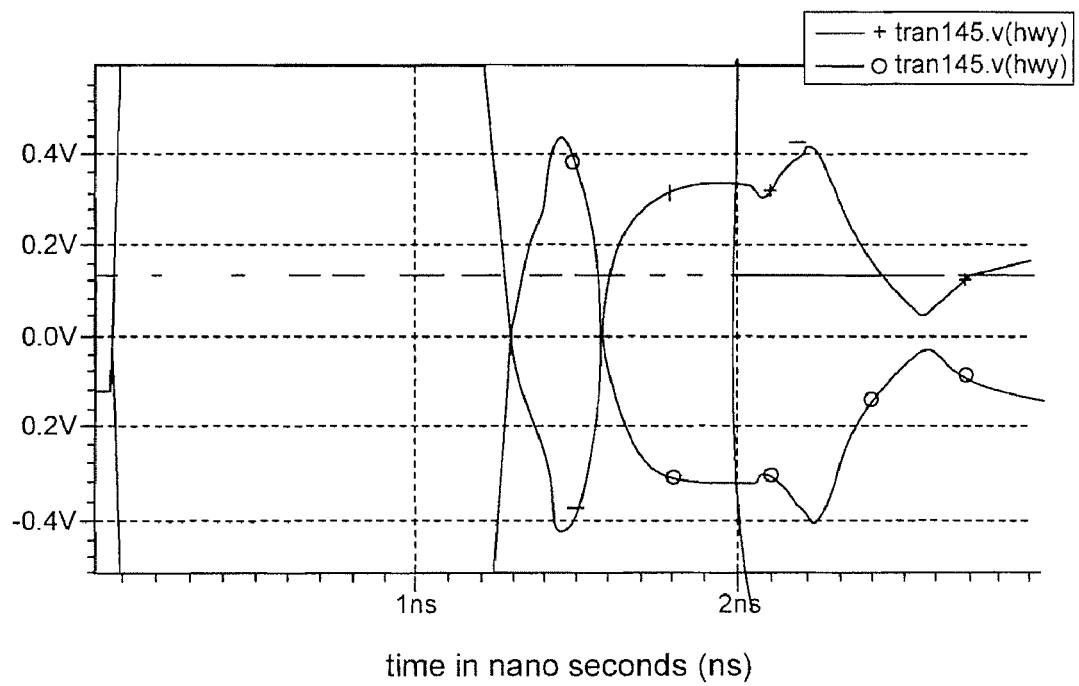
FIG. 7 shows an enlargement of the graph shown in FIG. 6.

FIG. 7 shows an expanded version of FIG. 6 in order to better illustrate the reflective components of the voltage that occurs between about 1.6 ns and about 3 ns in FIG. 7. As can be seen, the settling voltage, which is between about 0.1 and 0.1 V in FIG. 4, is well below the actual voltage in this graph, which in the same time frame ranges to about ±0.4 V. This voltage represents the power reflected from transmission line 180 as a result of the impedance mismatch between driver and the transmission line.

In FIGS. 4-7, the voltages and timings provided are exemplary only and are not intended to be limiting. Any voltage and timing range can be experienced in various impedance matching situations. Impedance matching circuits according to the present invention can be utilized in any of these impedance matching situations.

Figure 8:
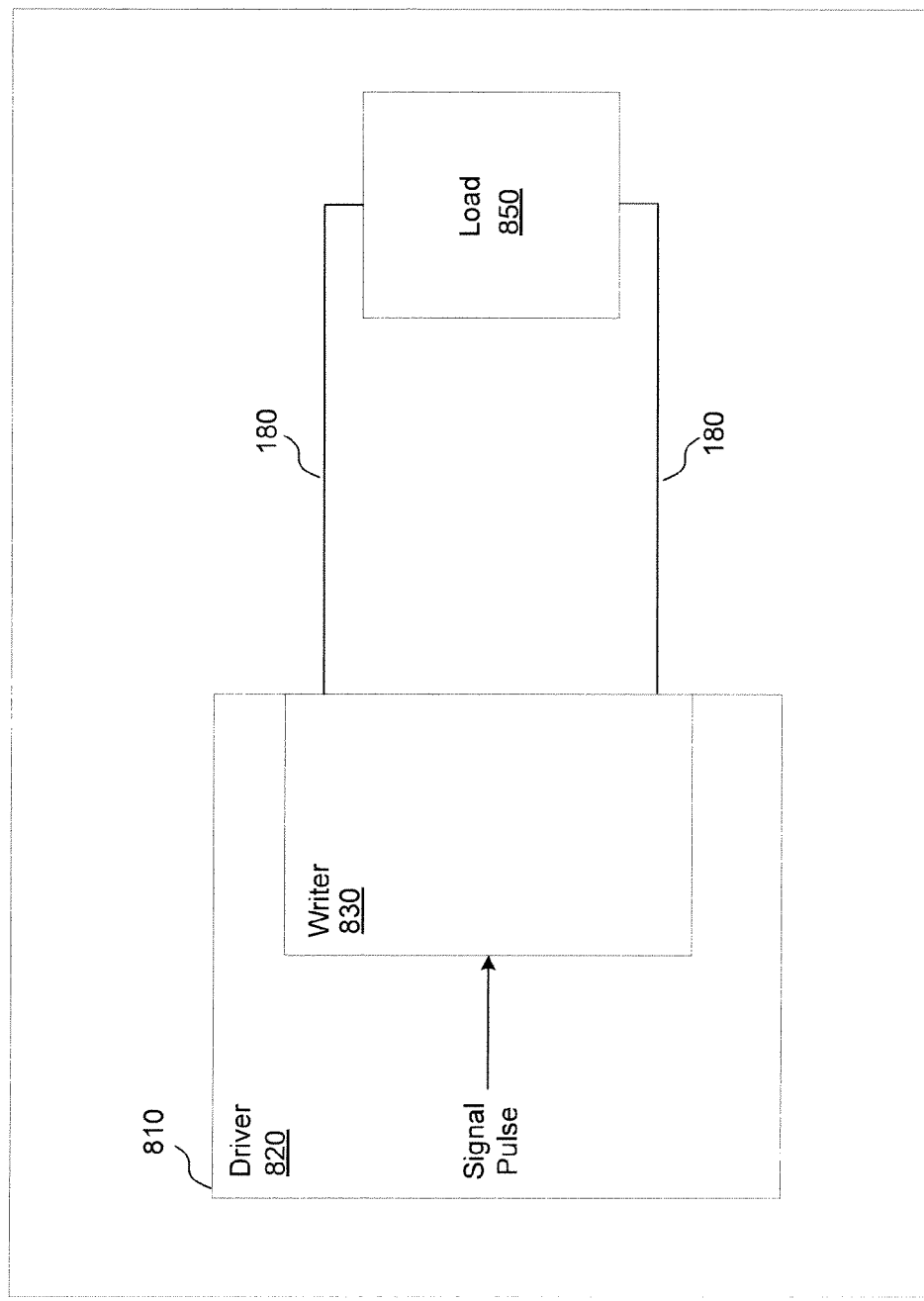
FIG. 8 illustrates a system for impedance matching according to some embodiments of the present invention.

FIG. 8 shows a block diagram of a driver system 810 according to some embodiments of the present invention. System 810 may include a driver 820 and a writer 830. Driver 820 may be any device that couples signal pulses into a load such as load 850. Load 850 may be any type of electrical load (e.g., a receiver chip or any other circuit) and can have any impedance characteristics. As shown in FIG. 8, driver 820 couples the signal pulse into a writer 830. Writer 830 adaptively matches the output impedance of system 810 to that of transmission line 180 so as to minimize the power reflected from transmission line 180. As shown in FIG. 8, load 850 may include any receiver devices for the signal pulse.

Figure 9:
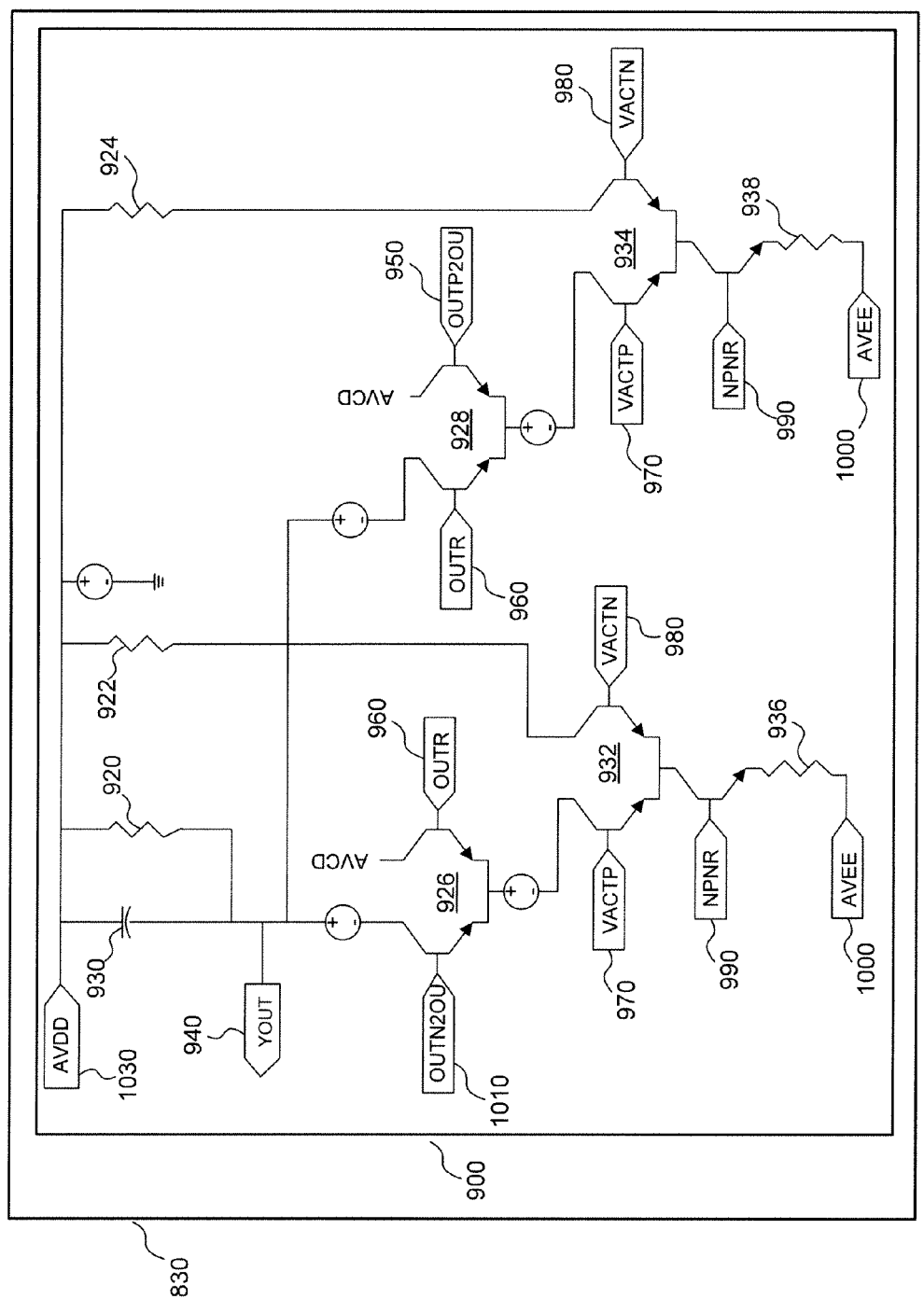
FIG. 9 illustrates a circuit diagram for an impedance matching circuit according to some embodiments of the present invention.

FIG. 9 illustrates a sensing circuit 900 that can be included in writer 830 according to some embodiments of the present invention. As shown in FIG. 9, a resistor 920 and capacitor 930 are coupled in parallel between a power voltage input 1030 AVDD and an output pin 940 YOUT. Resistor 920 functions to discharge capacitor 930 so that the voltage at output pin 940 YOUT is the power voltage on power voltage input 1030, Vdd. The voltage at output pin 940 YOUT will be decreased from Vdd by supplying current to capacitor 930.

Current is provided to capacitor 930 through switches 926, 928, 932, and 934. Switches 932 and 934 are arranged so that before a certain time they pull current from resistors 922 and 924, respectively, and after a certain time they pull current from switches 926 and 928, respectively. The timing is dependent on input signals VACTP at pin 970 and VACTN at pin 980. Essentially, signals VACTN and VACTP can be arranged so that, for example, prior to 1.8 ns current is drawn from resistors 922 and 924 and from 1.8 ns to about 3.0 ns current is drawn from switches 926 and 928. Input signals NPNR on pin 990 and AVEE on pin 1000 help to bias the amount of current pulled through switches 932 and 934.

When activated by switches 932 and 934, switches 926 and 928 selectively provide current to capacitor 930. As illustrated in FIG. 9, if the voltage OUTR at pin 960 is between OUTN and OUTP, then current is drawn through switches 926 and 928 through source AVCD. OUTR at pin 960 is analogous to node 150 and/or 160, as shown in FIGS. 1 and 2. However, if voltage OUTR is higher than OUTP switch 928 provides current from capacitor 930 and if voltage OUTR is lower than OUTN switch 926 provides current from capacitor 930. Capacitor 930, then, integrates the current provided in the time during which the voltage reflected back into writer 830 is above or below threshold voltages OUTP and OUTN during a time later than t, which can be about 1.8 ns from the signal pulse transmission. The base voltage at transistor 120 and/or 122 may then be adjusted to match the impedance.

Figure 10:
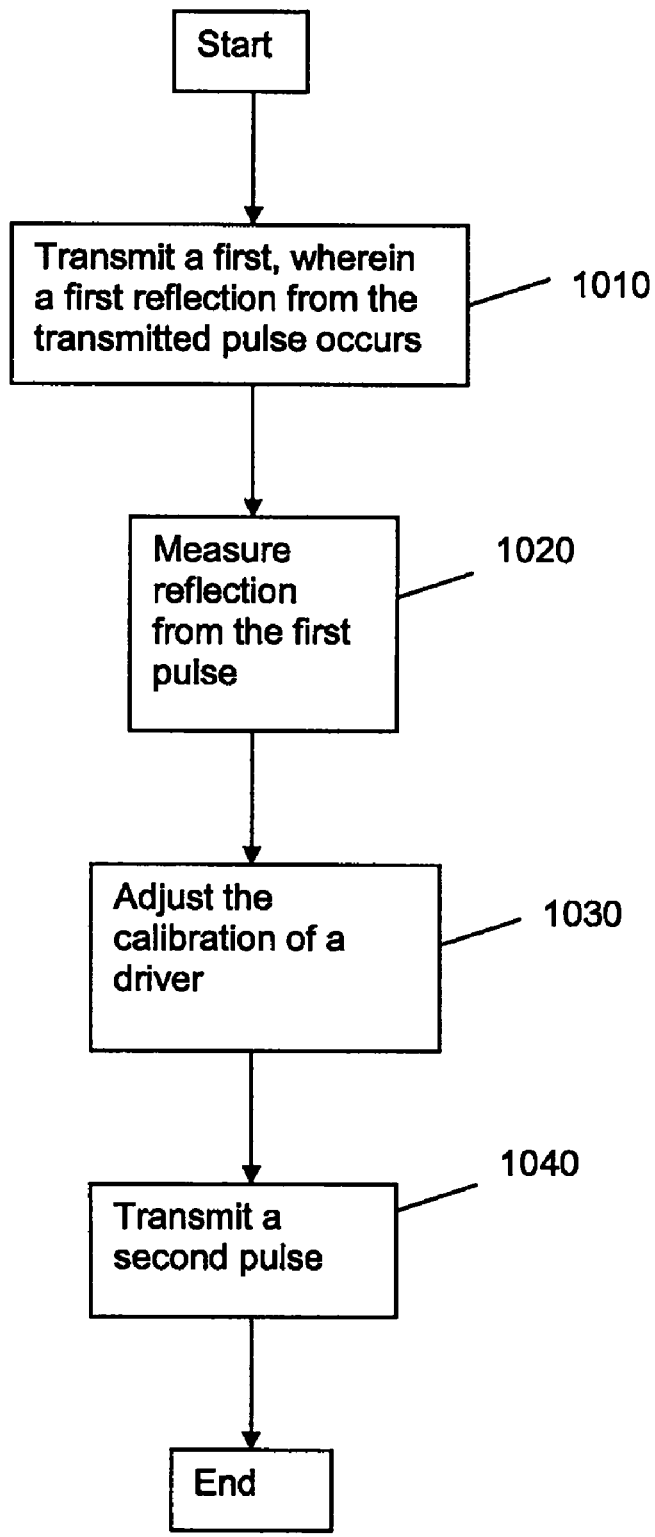
FIG. 10 shows a flow chart illustrating a method of impedance matching according to some embodiments of the present invention.

FIG. 10 shows a flow chart of a method, consistent with some embodiments of the present invention, for performing impedance matching to a transmission line. As shown in FIG. 10, a first pulse may be transmitted from driver 810 to load 850 through transmission line 180. A portion of the first pulse may be reflected as a first reflection from load 850 back into transmission line 18A0. This reflection may be caused by an impedance mismatch between driver 810 and load 850. In step 1020, a second reflection, if any, from the first pulse may be measured in writer 830. The second reflection may be caused by impedance mismatch between driver 810 and transmission line 180. Writer 830 can then adjust the calibration of driver 810 in response to the measured second reflection of the first pulse (step 1030). Such adjustments to the calibration of driver 810 may include adjusting the voltage and/or current of driver's 810 outputs. Adjustments of the calibration of driver 810 may be done automatically. Writer 830 may be located in driver 810. A second pulse may then be transmitted from the adjusted driver 810 to load 850 (step 1040).

Figure 11:
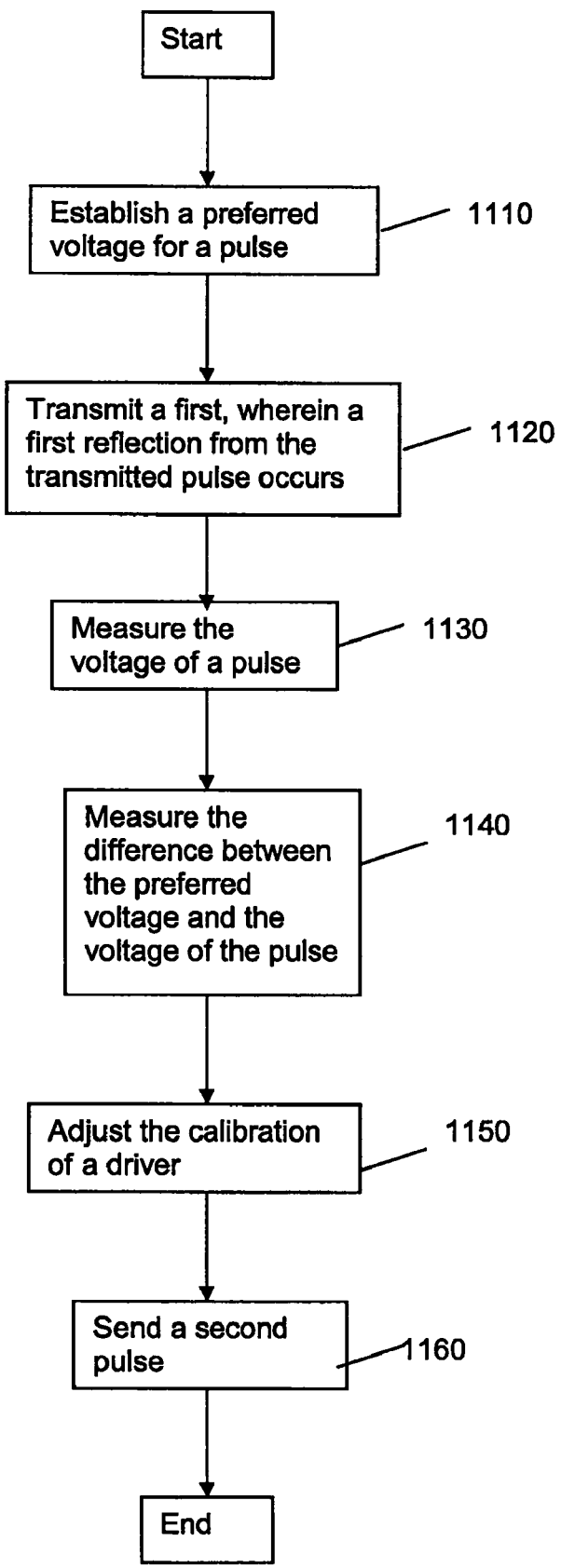
FIG. 11 shows a flow chart illustrating a method of impedance matching according to some embodiments of the present invention.

FIG. 11 illustrates a flow chart of a method, consistent with embodiments of the present invention. As shown in FIG. 11, a preferred voltage for a first pulse transmitted from driver 810 to load 820 may be established (step 1110). The preferred voltage may be a range of voltages. A first pulse may then be transmitted from driver 810 to load 820 through transmission line 180 (step 1120). The voltage of the first pulse may be measured. (step 1130). Then the difference between the preferred voltage and the voltage of the first pulse may be measured (step 1140). The calibration of driver 810 may be adjusted based on the measured difference between the preferred voltage and the voltage of the first pulse (step 1150). Adjustments of the calibration of driver 810 may be done automatically. A second pulse may then be sent by adjusted driver 810 to load 820 through transmission line 180 (step 1160).

A timer may be used to measure a length of time that the voltage of the first pulse is above or below the preferred voltage for the pulse. The timer may include nodes 970 and 980 and switches 932 and 934, as shown in FIG. 9. The calibration of driver 810 may then be adjusted based on the measured length of time the voltage of the first pulse is above or below the trigger voltages for the first pulse.

Figure 12:
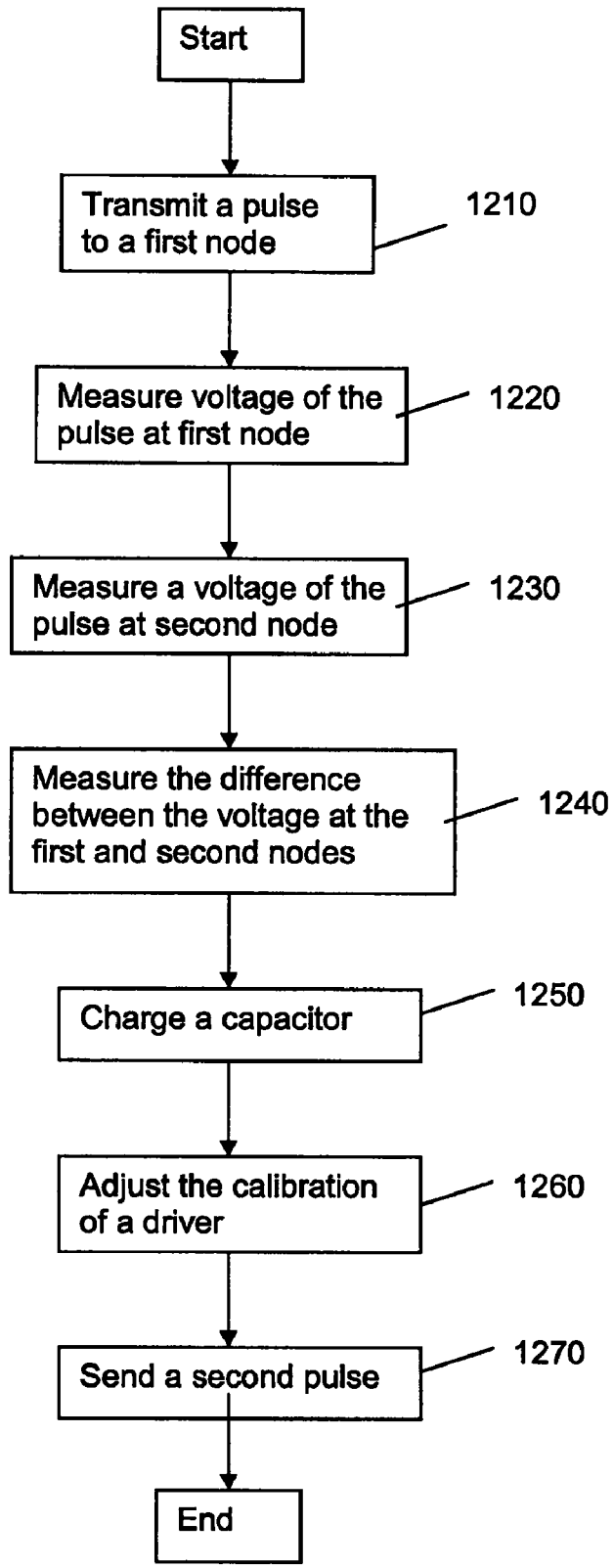
FIG. 12 shows a flow chart illustrating a method of impedance matching according to some embodiments of the present invention.

FIG. 12 is a flow chart showing a method, consistent with embodiments of the present invention. As shown in FIG. 12, a first pulse may be transmitted from driver 810 to load 820 in a circuit containing at least first node 950, second node 960 and capacitor 930 (step 1210). The voltage of the first pulse may be measured at first node 950 and at second node 960 (step 1220 and 1230). The voltage at second node 960 may correspond to the preferred voltage for the first pulse. The voltages of the first pulse at first node 950 and second node 960 are then compared (step 1240) and capacitor 930 may be charged when the voltage at first node 950 is greater than the voltage at second node 960 (step 1250). The calibration of the driver may then be adjusted in response to the voltage across the charged capacitor (step 1260). Adjustments of the calibration of the driver may be done automatically. A second pulse may then be transmitted (step 1270).

A timer may be used to measure an interval after the transmission of the first pulse. This interval may begin when the first pulse is transmitted and its duration may be, for example, 2 ns. Resistor 920 may be set to stop the flow of current through the circuit for the measured interval of time.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for matching an impedance between a driver and a transmission line, wherein the transmission line is between the driver and a load, the method comprising:
   transmitting a first pulse from the driver to the load through the transmission line, wherein a first reflection from the transmitted first pulse occurs after a first time;
   measuring a second reflection from the transmitted first pulse after a second time; and
   adjusting the calibration of the driver in response to the measured second reflection.

2. The method of claim 1, wherein the first time corresponds to a settling time.

3. The method of claim 1, wherein the second time is prior to transmission of a second pulse.

4. The method of claim 1, wherein measuring a reflected pulse includes charging a capacitor during the time after the first time and before the second time that the voltage on the transmission line is outside a preset range of voltages.

5. The method of claim 4, wherein adjusting the calibration of the driver includes adjusting the calibration of the driver in response to a voltage across the capacitor.

6. A method for adjusting an output impedance of a driver to an impedance of a transmission line, the transmission line being coupled to the driver and a load, the method comprising:
   establishing a range of voltages corresponding to a settling voltage;
   transmitting a first pulse from the driver to the load through the transmission line, wherein a first reflection from the transmitted first pulse occurs after a first time;
   measuring a second reflection from the transmitted first pulse by determining the time after a first time that a voltage of the second reflection lies outside the range of voltages; and
   adjusting the calibration of the driver in response to the measured second reflection.

7. The method of claim 6, wherein measuring a second reflected pulse includes charging a capacitor during the time after the first time in which the voltage of the reflected pulse lies outside the range of voltages.

8. An apparatus for matching impedance between a driver and a transmission line, comprising:
   a writer circuit, the writer circuit including
      a first switch coupled to charge a capacitor when a voltage is outside a range of voltages, and
      a second switch coupled to allow current through the first switch after a first time; and
      a sensing circuit receiving a voltage across the capacitor of the writer circuit, the sensing circuit adjusting an output impedance of the driver in response to the voltage across the capacitor.

\* \* \* \* \*